United States Patent Office 3,536,622
Patented Oct. 27, 1970

3,536,622
BIODEGRADABLE EMULSIFIABLE LUBRICANT COMPOSITIONS
Albert T. Knecht, Jr., Hazel Crest, Ill., and David B. Sheldahl, Griffith, Ind., assignors to Sinclair Research, Inc., New York, N.Y., a corporation of Delaware
No Drawing. Filed Dec. 11, 1967, Ser. No. 689,324
Int. Cl. C10m 3/26
U.S. Cl. 252—34.7     10 Claims

ABSTRACT OF THE DISCLOSURE

A lubricating composition which is essentially biodegradable and dispersible in water is made from about 65 to 85 wt. percent of an alpha-olefin, about 2 to 5 wt. percent of water, about 8 to 20 weight percent of a monocarboxylic acid (e.g. oleic acid), about 1.2 to 4 weight percent of a base which can be ammonia, an amine, or an alkali metal hydroxide and about 2 to 8 weight percent of an alcohol (e.g. hexylene glycol).

---

This invention relates to novel emulsifiable fluid compositions that are biodegradable. More particularly, this invention pertain to novel hydrocarbon based emulsifiable lubricants and coolants which contain components that are essentially completely degraded by microorganisms common to waste-treatment systems.

Lubricants and coolants in industrial use today for a variety of operations, such as cutting, extruding, machining and forming metals, glass, etc., often called soluble or emulsifiable oils, generally contain a petroleum oil base compounded with emulsifiers and coupling agents to effect stable emulsions when mixed with large amounts of water. Anionic emulsifiers, such as sodium mahogony sulfonates, are most often used due to the higher cost of the non-ionic type emulsifiers. Good emulsion stability has been effected in glass processing and metal working applications when anionic emulsifiers are employed in the soluble or emulsifiable oil compositions. In fact, the quality of good emulsion stability has created disposal problems of the used emulsions especially in industries where large volumes of the oils are employed. Industrial plants customarily have disposed of their used emulsion effluents by running them directly into natural streams. Recent legislation and public interest in pollution abatement will make it necessary, if plants continue to use conventional petroleum-based soluble oils, to employ expensive and impractical processes of breaking the emulsions down with acids or salts to remove the oil before depositing the effluents into the streams. Alternatively, the effluents can be economically deposited into sanitary sewers. However, it was found that conventional soluble oil emulsions containing petroleum oil and other nonbiodegradable substances caused the activated sludge of the sewage disposal plant to be made inactive.

We have now found a novel emulsifiable fluid composition suitable for use as an aqueous dispersion in various types of industrial processing and metal-working applications which novel compositions are in essence completely biodegradable and can be economically disposed of after use by direct transferral to a waste-treatment system. The novel fluid composition of the invention is made from about 8 to 20, preferably about 10 to 13, weight percent of a monocarboxylic acid, about 1.2 to 4, preferably about 1.4 to 1.6, weight percent of a salt-forming base, about 2 to 8, preferably about 4 to 6 weight percent of an alcohol, about 2 to 5, preferably about 3 to 4 weight percent of water, and about 65 to 85, preferably about 75 to 85 weight percent of alpha-olefins. The exact proportions of each component may vary depending upon the particular machining operation or industrial process in which the composition is employed. When the salt-forming base is an alkanol amine it is often used in an amount of at least about 125% of that needed to neutralize the acid and this excess may impart anti-corrosive properties to the composition.

The alpha-olefin or α-monoalkenes employed in the composition of the present invention can be represented by the formula

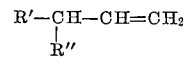

wherein $R'$ and $R''$ are selected from the group consisting of hydrogen and alkyl groups, and the total number of carbon atoms is from about 5 to 25, preferably about 12 to 22 carbon atoms. Preferably, one of $R'$ and $R''$ is hydrogen and the other is a straight chained alkyl to give a normal olefin. The alpha-olefins are often used as a mixture and may contain minor amounts, usually less than 10% by weight of other hydrocarbons such as other olefins, diolefins and saturated hydrocarbons.

The monocarboxylic acid component used in the composition of the present invention is an aliphatic hydrocarbon monocarboxylic acid having about 10 to 32 carbon atoms and is preferably a straight chain acid. Suitable aliphatic monocarboxylic acids include saturated fatty acids such as lauric, myristic, palmitic, stearic, behenic, cerotic as well as olefinically-unsaturated fatty acids such as oleic, linoleic, linolenic, ricinoleic, etc.

As the base component, capable of forming a salt with the monocarboxylic acid, alkali metal hydroxides such as sodium and potassium hydroxide are preferred. Other suitable bases include ammonia and amines. In general, amines having the following structural formula may be used as the base component in this invention:

$$R_mNH_n$$

wherein R is an alkyl or hydroxyalkyl group of 2 to 12, preferably 2 to 4, carbon atoms, $m$ is 1 to 3 and $n$ is 0 to 2. Some examples of the amines that may be used in the compositions of the invention include monomethanolamine, monoethanolamine, monobutanolamine, diethanolamine, triethanolamine, methylamine, ethylamine, n-propylamine n-butylamine, dimethylamine, diethylamine, trimethylamine, etc.

The alcohol component of the composition of the invention is included as a coupling agent and to prevent freezing. Suitable alcohols, including glycols and glycol ethers, are water-soluble in the amounts used and other contain 1 to about 25 carbon atoms and can correspond to the general formula:

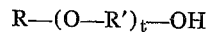

wherein R and R' are aliphatic hydrocarbon radicals and R can also be a hydroxyl radical, preferably saturated, of about 1 to 12 carbon atoms and $t=0$ to 3. Some examples of alkanols that may be used in the composition of the invention include the monohydric alkanols, such as methanol, ethanol, n-propanol, isopropanol, n-butanol, isobutanol, sec-butanol, tertbutanol, etc.; glycols, such as ethylene glycol, propylene glycol, 1,3-propanediol, 1,2-butanediol, 2,3-butanediol, hexylene glycol, 1,4-butanediol, pinacol, etc.; polyols, such as glycerol, erythritol, pentaerythritol, ribitol, sorbitol, etc.; alkoxy-alcohols, for example, the hydroxy ethers, such as, methoxymethanol, 1-methoxyethanol, 2-methoxyethanol, 1-ethoxyethanol, 2-ethoxyethanol, 2-ethoxypropanol, 2-ethoxybutanol, diethylene glycol, triethylene glycol, etc.; polyether glycols, e.g. polyethylene glycols, of up to about 750 or more molecular weight; and like compounds.

In use as water dispersed lubricants or coolants the compositions of this invention may be dispersed in the desired amount of water, often about 5 to 400 or more parts of water, depending upon the particular application contemplated. The composition of the invention is especially useful for lubricating solid, e.g. metal, surfaces in contact with molten glass by providing a lubricating amount of an aqueous dispersion of the composition between the surface and the glass. For example, in use as a glass working fluid one part of the lubricant composition for approximately each 100 or 400 parts of water, preferably for approximately each 300 parts of water, may be used to obtain satisfactory results.

It may be desirable to add a small amount, say about 0.1 to 5% by weight of other ingredients such as anti-foam agents, anti-wear additives, biocides, preservatives, anti-gelling agents, metal deactivators, etc. If such additives be incorporated, it is important that they be biodegradable, especially in a sanitary sewage treating system.

minute. Slight mixing (100 r.p.m.) was used to keep the sludge in suspension during operation. Retention time in the system was limited to eight hours, the maximum expected in a normal treating operation. At the end of this period, air flow and mixing were discontinued and the sludge allowed to settle. The clear water was siphoned off and fresh synthetic sewage added. Approximately 1.5 liters of sludge remained in the fermentor after the clear effluent was removed. Samples (200 ml.) were collected initially, at four and at eight hours. Chemical and Biochemical Oxygen Demand determinations were made on clear supernate from each sample, employing the procedures outlined in "Standard Methods for the Examination of Water and Waste-Water" American Public Health Association, Inc., 1960.

Five such runs were made. The first, third and fifth runs were made without the novel composition of this composition or Dowicide Q in order to obtain information on sludge activity.

Results presented in Table I demonstrate the complete degradation of the composition of the invention as indicated by COD and BOD (Chemical and Biochemical Oxygen Demand) determinations. These procedures are routinely used by disposal plant operators to determine the quality of their effluent.

TABLE I.—Disposal of the Composition of the Invention in a Simulated Activated Sludge System

| Run No. | Chemical oxygen demand (COD) p.p.m. exposure time (hours) | | | Five day biochemical oxygen demand (BOD) p.p.m. exposure time (hours) | | |
|---|---|---|---|---|---|---|
|  | 0 | 4 | 8 | 0 | 4 | 8 |
| (1) Blank (no soluble oil) | 278 | 161 | 118 | 258 | 60 | 20 |
| (2) Soluble oil of example at (2.3 ml.) | 1 541 | 180 | 145 | 1 370 | 93 | 44 |
| (3) Blank (no soluble oil) | 396 | 122 | 102 | 230 | 93 | 11 |
| (4) Soluble oil of example (2.3 ml.) plus Dowicide Q (35 mg.) | 1 619 | 125 | 110 | 1 380 | 70 | 32 |
| (5) Blank (no soluble oil or Dowicide Q) | 333 | 133 | 106 | 210 | 107 | 33 |

1 These determinations are low due to adsorption of the water-soluble lubricant on the activated sludge.

EXAMPLE

Composition: Wt. percent
- Oleic acid _____ 12
- Potassium hydroxide _____ 1.6
- Hexylene glycol _____ 5
- Water _____ 3.5
- Alpha olefins _____ 77.9

A 1:30 dilution of fluid composition prepared above was subjected to a biodegradability test, using a simulated activated sludge system. Tests were also run on a 1:30 dilution of the composition containing 500 p.p.m. of Dowicide Q, 1-(3-chloroallyl)-3,5,7-triaza-1-azoniaadamantane chloride which may be used to preserve biodegradable products. A 14 liter New Brunswich Micro-Ferm fermentor was used to simiulate an activated sludge sewage treatment system. Activated sludge and raw sewage were obtained from a local disposal plant. The synthetic sewage used in all tests was prepared as follows:

Synthetic Sewage: (Huddleston, R. L., and Allred, R. C., Evaluation of Detergent Degradation Using Activated Sludge J. Am. Oil Chemists 41 (11) 732–735, November 1964).
Bacto Peptone—3.5 gm.
NaCl—3.0 gm.
K₂HPO₄—0.5 gm.
MgSO₄·7H₂O—0.2 gm.
Raw sewage—1 liter
Deionized water—11 liters Ten liters of synthetic sewage containing between 2000 to 3000 mg./liter (dry weight) activated sludge as recommended for normal sewage plant operation were added to the fermentor. Temperature was held at 25° C. and the air flow controlled at approximately one liter per It is claimed:
1. A water-dispersible, biodegradable fluid composition consisting essentially of about 65 to 90 weight percent of an alpha-olefin of the formula:

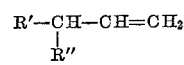

wherein R' and R'' are selected from the group consisting of H and alkyl and which olefin contains about 5 to 25 carbon atoms, about 8 to 20 weight percent of aliphatic hydrocarbon monocarboxylic acid having about 10 to 32 carbon atoms, about 1.2 to 4 weight percent of a base selected from the group consisting of ammonia, an alkali metal hydroxide and an amine, said amine having the structure:

wherein R is selected from the group consisting of alkyl, or hydroxyalkyl groups and contains about 2 to 12 carbon atoms, $m$ is 1 to 3 and $n$ is 0 to 2, about 2 to 8 weight percent of a water-soluble alcoholic coupling agent and about 2 to 5 weight percent of water.

2. The composition of claim 1 wherein the base is an alkali metal hydroxide.

3. The composition of claim 1 wherein the alcohol is hexylene glycol.

4. The composition of claim 1 wherein the acid is oleic acid.

5. The composition of claim 1 comprising about 75 to 85 weight percent of said alpha-olefin of about 12 to 22 carbon atoms, about 10 to 13 weight percent of said monocarboxylic acid, about 1.4 to 1.6 weight percent of said base, about 4 to 6 weight percent of said alcoholic coupling agent, and about 3 to 4 weight percent water.

6. The composition of claim 5 wherein the alpha-olefin is a normal olefin.

7. The composition of claim 6 wherein the acid is straight chained.

8. The composition of claim 7 wherein the base is an alkali metal hydroxide.

9. The composition of claim 7 wherein the alcohol is hexylene glycol.

10. The composition of claim 9 wherein the acid is oleic acid.

References Cited

UNITED STATES PATENTS

| | | | |
|---|---|---|---|
| 2,963,391 | 12/1960 | Kubie | 252—34 |
| 3,288,715 | 11/1966 | Owens et al. | 252—59 |
| 3,304,258 | 2/1967 | White et al. | 252—34 |

DANIEL E. WYMAN, Primary Examiner

J. M. HICKEY, Assistant Examiner

U.S. Cl. X.R.

252—42, 49.5, 59